United States Patent
Kim et al.

(10) Patent No.: US 9,154,930 B2
(45) Date of Patent: Oct. 6, 2015

(54) APPARATUS AND METHOD FOR SHARING DATA

(75) Inventors: Jae Hoon Kim, Yongin-si (KR);
Myeong Wuk Jang, Seoul (KR); Ji Hoon Lee, Anyang-si (KR);
Joong-Hong Park, Seoul (KR);
Sung-Chan Choi, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 12/943,700

(22) Filed: Nov. 10, 2010

(65) Prior Publication Data

US 2011/0111776 A1    May 12, 2011

(30) Foreign Application Priority Data

Nov. 11, 2009  (KR) .................. 10-2009-0108457

(51) Int. Cl.
*H04W 4/12* (2009.01)
*H04W 4/20* (2009.01)
*H04W 28/06* (2009.01)

(52) U.S. Cl.
CPC .............. *H04W 4/206* (2013.01); *H04W 4/12* (2013.01); *H04W 28/065* (2013.01)

(58) Field of Classification Search
CPC .................................. H04W 4/12; H04W 4/14
USPC .......... 455/466, 405–407, 450–452; 370/449, 370/443, 450
See application file for complete search history.

(56) References Cited

U.S. PATENT DOCUMENTS

| | | | | |
|---|---|---|---|---|
| 6,014,765 | A  * | 1/2000  | Maeda et al. | 714/748 |
| 6,351,468 | B1 * | 2/2002  | LaRowe et al. | 370/449 |
| 6,879,579 | B1 * | 4/2005  | Myles et al. | 370/348 |
| 8,260,949 | B2 * | 9/2012  | Karpoff | 709/231 |
| 2004/0093370 | A1 * | 5/2004  | Blair et al. | 709/200 |
| 2008/0255754 | A1 * | 10/2008 | Pinto | 701/119 |
| 2009/0031340 | A1 * | 1/2009  | Modi et al. | 725/33 |
| 2010/0279647 | A1 * | 11/2010 | Jacobs et al. | 455/404.1 |

FOREIGN PATENT DOCUMENTS

| | | |
|---|---|---|
| JP | 2008-072601 | 3/2008 |
| JP | 2009-077212 | 4/2009 |
| JP | 2009-129408 | 6/2009 |
| KR | 10-2007-0085696 | 8/2007 |
| KR | 10-2008-0019939 | 3/2008 |
| KR | 10-2008-0055308 | 6/2008 |
| KR | 10-2009-0054332 | 5/2009 |

* cited by examiner

*Primary Examiner* — Michael T Vu
(74) *Attorney, Agent, or Firm* — NSIP Law

(57) ABSTRACT

Provided is a system for sharing data using a network. When a data transmission apparatus included in the data sharing system generates data, the data transmission apparatus may transmit a data generation message to a data reception apparatus. The data reception apparatus may receive the data based on the data generation message.

18 Claims, 8 Drawing Sheets

APPARATUS AND METHOD FOR SHARING DATA

CROSS-REFERENCE TO RELATED APPLICATION(S)

This application claims the benefit under 35 U.S.C. §119(a) of Korean Patent Application No. 10-2009-0108457, filed on Nov. 11, 2009, in the Korean Intellectual Property Office, the entire disclosure of which is incorporated herein by reference for all purposes.

BACKGROUND

1. Field

The following description relates to data transmission technology or data sharing technology.

2. Description of Related Art

The Internet is an open network adopting a common communication protocol such as a transmission control protocol/internet protocol (TCP/IP), and the like, and provides a variety of services such as an information search, an electronic email, a file transfer, etc. In particular, with an increase in a speed of the Internet, sales and distribution of various data sources such as multimedia contents, etc., become possible.

In a data transmission method using the Internet, a data reception apparatus desiring to receive transmission data transmits a data transmission request message to a data transmission apparatus including the transmission data. In response to the data transmission request message, the data transmission apparatus transmits the transmission data to the data reception apparatus.

When transmission data is generated according to a particular event, for example, a car accident, and the like, the data transmission apparatus may be unaware of a generated point in time of the transmission data. Accordingly, the data reception apparatus may repeatedly transmit the data transmission request message to the data transmission apparatus. When transmission data is generated, the data transmission apparatus may transmit the transmission data to the data reception apparatus in response to the data transmission request message.

When the data transmission apparatus does not include transmission data, the data transmission apparatus may not transmit the transmission data to the data reception apparatus. In this case, the data reception apparatus may have consumed resources meaninglessly.

When wireless Internet is used, wireless resources, such as time intervals, frequency bands, and the like, may be limited. Accordingly, there is a desire for a wireless data transmission method that may effectively receive data from a data transmission apparatus.

SUMMARY

In one general aspect, there is provided a data transmission apparatus, including: a transmitter configured to transmit, to a data reception apparatus, a data generation message including information associated with transmission data, and a receiver configured to receive a data request message from the data reception apparatus in response to the data generation message, wherein, in response to the data request message, the transmitter is further configured to transmit the transmission data to the data reception apparatus.

The data transmission apparatus may further include that information associated with the transmission data includes at least one of: a name of the transmission data, a creator of the transmission data, a generated time of the transmission data, a format of the transmission data, and a capacity of the transmission data.

The data transmission apparatus may further include: a data divider configured to divide the transmission data into a plurality of segments, wherein the transmitter is further configured to transmit each of the segments to the data reception apparatus.

The data transmission apparatus may further include that the receiver is further configured to receive, from the data reception apparatus, a reception confirmation message with respect to the data generation message.

The data transmission apparatus may further include that: the transmitter is further configured to generate the data generation message via a data transmission hub configured to maintain state information associated with the data reception apparatus, and the receiver is further configured to receive the data request message via the data transmission hub.

The data transmission apparatus may further include that: the data reception apparatus includes a primary data reception apparatus and a secondary data reception apparatus, the receiver is further configured to receive the data request message from the primary data reception apparatus and the secondary data reception apparatus, the secondary data reception apparatus is configured to receive the data request message from the primary data reception apparatus, the transmitter is further configured to transmit the transmission data to the secondary data reception apparatus, and the secondary data reception apparatus is further configured to transmit the transmission data to the primary data reception apparatus.

In another general aspect, there is provided a data reception apparatus, including: a receiver configured to receive, from a data transmission apparatus, a data generation message including information associated with transmission data, and a transmitter configured to transmit a data request message to the data transmission apparatus in response to the data generation message, wherein, in response to the data request message, the receiver is further configured to receive the transmission data from the data transmission apparatus.

The data reception apparatus may further include that information associated with the transmission data includes at least one of: a name of the transmission data, a creator of the transmission data, a generated time of the transmission data, a format of the transmission data, and a capacity of the transmission data.

The data reception apparatus may further include that the transmitter is further configured to transmit, to the data transmission apparatus, a reception confirmation message with respect to the data generation message.

The data reception apparatus may further include that: the transmitter is further configured to transmit the data request message to a second data reception apparatus configured to receive the transmission data from the data transmission apparatus, and in response to the data request message, the receiver is further configured to receive the transmission data from the second data reception apparatus.

The data reception apparatus may further include that: the receiver is further configured to receive the data generation message via a data transmission hub configured to maintain state information associated with the data reception apparatus, and the transmitter is further configured to transmit the data request message via the data transmission hub.

In another general aspect, there is provided a data transmission hub, including: a table generator configured to generate an association table containing state information associated with a data reception apparatus connected to the data transmission hub, a receiver configured to generate a data generation message from a data transmission apparatus, and a transmitter configured to forward the data generation message to the data reception apparatus based on the association table.

The data transmission hub may further include that: in response to the data generation message, the receiver is further configured to receive a data request message from the data reception apparatus, and the transmitter is further configured to forward the data request message to the data transmission apparatus.

The data transmission hub may further include that: in response to the data request message, the receiver is further configured to receive transmission data from the data transmission apparatus, and the transmitter is further configured to forward the transmission data to the data reception apparatus.

The data transmission hub may further include that the state information corresponds to information regarding whether the data reception apparatus is ready to receive the transmission data.

In another general aspect, there is provided a data transmission hub, including: a receiver configured to generate a data generation message from a data transmission apparatus, and a transmitter configured to forward the data generation message to a data reception apparatus based on state information associated with the data reception apparatus.

In another general aspect, there is provided a data transmission method, including: transmitting, to a data reception apparatus, a data generation message containing information associated with transmission data, receiving a data request message from the data reception apparatus in response to the data generation message, and in response to the data request message, transmitting the transmission data to the data reception apparatus.

In another general aspect, there is provided a data reception method, including: receiving, from a data transmission apparatus, a data generation message containing information associated with transmission data, transmitting a data request message to the data transmission apparatus in response to the data generation message, and in response to the data request message, receiving the transmission data from the data transmission apparatus.

In another general aspect, there is provided a data transmission method, including: generating an association table containing state information associated with a data reception apparatus connected to a data transmission hub, generating a data generation message from a data transmission apparatus, and forwarding the data generation message to the data reception apparatus, based on the association table.

In another general aspect, there is provided a data transmission method, including: generating a data generation message from a data transmission apparatus, and forwarding the data generation message to a data reception apparatus based on state information associated with the data reception apparatus.

Other features and aspects may be apparent from the following detailed description, the drawings, and the claims.

Figure 1A:
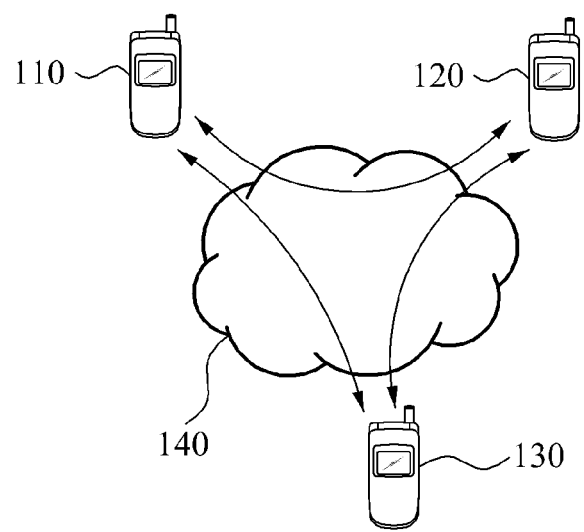
FIGS. 1A and 1B are diagrams illustrating concepts of transmitting data over a communication network according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1B:
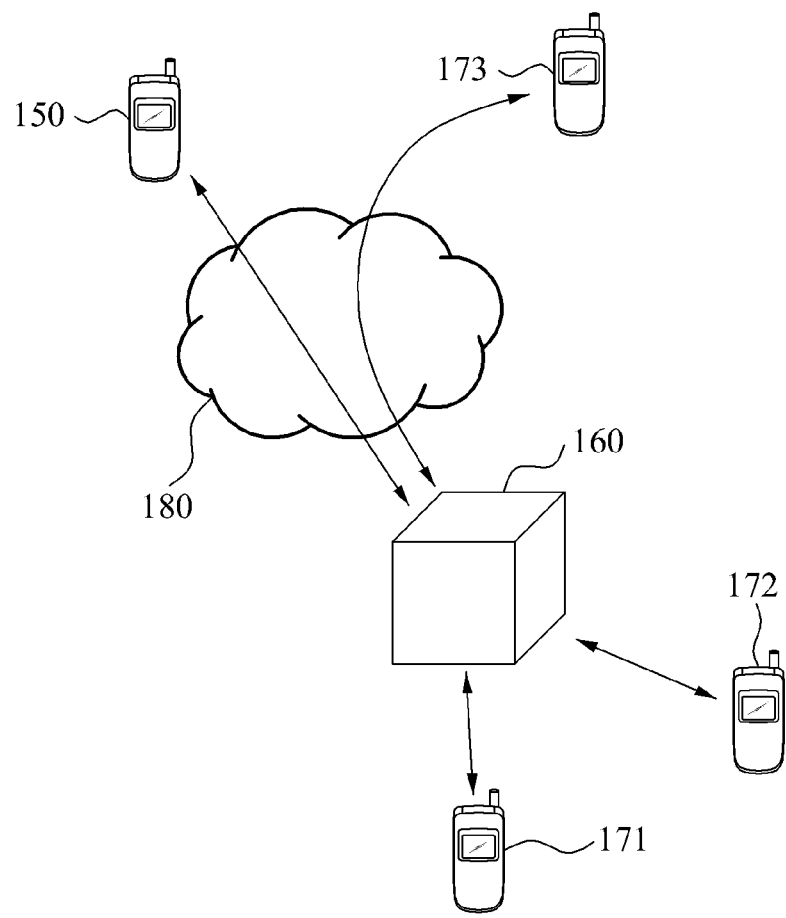

FIGS. 1A and 1B illustrate concepts of transmitting data over a communication network.

Referring to FIG. 1A, a data transmission apparatus 110 may directly transmit data to data reception apparatuses 120 and 130 over a communication network 140. The data transmitted by the data transmission apparatus 110 may be time related data, e.g., news data and traffic information.

The traffic information may be closely related to a time and thus may have no meaning as data, e.g., invalid data, when a predetermined period of time elapses after the traffic information is generated. For example, when an accident occurs in a particular area, the accident may need to be immediately reported to the data reception apparatuses 120 and 130 of a corresponding area.

The data reception apparatuses 120 and 130 may not predict when a traffic accident occurs, and thus when traffic information is generated, the validity of current data may be uncertain. Accordingly, the data reception apparatuses 120 and 130 may periodically transmit a data request message to the data transmission apparatus 110. When new data is generated, the data transmission apparatus 110 may transmit the current traffic information to the data reception apparatuses 120 and 130 in response to the data request message.

However, when new and/or current traffic information is not generated, the data request message transmitted by the data reception apparatuses 120 and 130 may have been unnecessarily transmitted, which may be regarded as a waste of wireless resources.

According to an embodiment, when traffic information data is generated, the data transmission apparatus 110 may transmit a data generation message to the data reception apparatuses 120 and 130. The data reception apparatuses 120 and 130 may determine that new traffic information is generated, based on the data generation message. In response to the data generation message, the data reception apparatuses 120 and 130 may transmit a data request message to the data transmission apparatus 110.

Only when new traffic information data is generated, the data reception apparatuses 120 and 130 may transmit the data request message and thus it may be possible to effectively use wireless resources. In other words, the data reception apparatuses 120 and 130 may be idle, with respect to data requesting, until they receive a data generation message from the data transmission apparatus 110.

The data transmission apparatus 110 may divide traffic information data into a plurality of segments and then may transmit the divided segments to the data reception apparatuses 120 and 130. The data reception apparatuses 120 and 130 may exchange corresponding received segments with each other.

Although is described above that data transmitted by the data transmission apparatus 110 corresponds to traffic information data, this is only an example, and thus a similar method may be applicable to other general data. For example, weather data, emergency data, school closing data, music or song (e.g., a favorite song playing on the radio) availability data, and other data that may be time-sensitive, may be used, or other data that may waste resources for unnecessary requests.

Referring to FIG. 1B, a data transmission apparatus 150 may transmit data to data reception apparatuses 171, 172, and 173 via a data transmission hub 160. For example, a set-top box installed in a home, a computer, a mobile terminal, etc., may be employed as the data transmission hub 160.

The data transmission apparatus 150 may transmit a data generation message to the data transmission hub 160 using a communication network 180.

The data transmission hub 160 may generate, maintain, and manage an association table with respect to the data reception apparatuses 171, 172, and 173 connected to the data transmission hub 160. The association table may include state information associated with each of the data reception apparatuses 171, 172, and 173. By referring to the association table, the data transmission hub 160 may determine whether each of the data reception apparatuses 171, 172, and 173 is ready to receive data from the data transmission apparatus 150. It should be appreciated that embodiments are not limited to a table, and other data storage formats may be used. The connection may be a communicative, e.g., wireless, connection or may be a physical connection, e.g., a cable, plug, or wire.

The data transmission hub 160 may forward a data generation message to the data reception apparatuses 171, 172, and 173 that may be ready to receive the data from the data transmission apparatus 150.

The data transmission hub 160 may directly transmit the data generation message to the data reception apparatuses 171 and 172. For example, when the data transmission hub 160 corresponds to a set-top box installed in a home, the data transmission hub 160 may directly transmit the data generation message to the data reception apparatuses 171 and 172 provided within the home where the data reception apparatuses 171 and 172 and the data transmission hub 160 may be located.

The data transmission hub 160 may transmit the data generation message to the data reception apparatus 173 via the communication network 180. When a user goes out of the home where the data transmission hub 160 may be located while carrying the data reception apparatus 173, the data transmission hub 160 may transmit the data generation message to the data reception apparatus 173 via the communication network 180.

Figure 2:
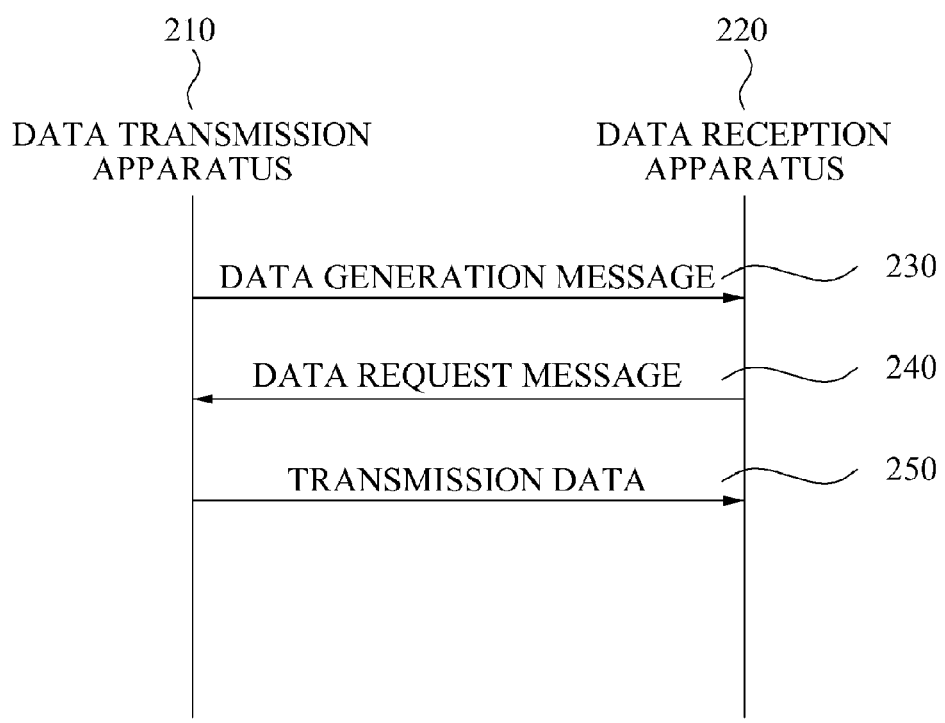
FIG. 2 is a diagram illustrating an example data transmission method.

FIG. 2 illustrates an example data transmission method.

At operation 230, a data transmission apparatus 210 may transmit a data generation message to a data reception apparatus 220. The data transmission apparatus 210 and data reception apparatus 220 may be similar to the data transmission apparatuses and data reception apparatuses illustrated in FIGS. 1A and 1B. The data generation message may include information associated with transmission data. Information associated with the transmission data may include, for example, at least one of: a name of the transmission data, a creator of the transmission data, a generated time of the transmission data, a format of the transmission data, and a capacity of the transmission data.

The data reception apparatus 220 may determine whether data generated by the data transmission apparatus 210 is necessary based on information associated with the transmission data. For example, the data reception apparatus 220 may determine whether transmission data corresponds to a motion picture of a particular movie or a music file of a theme song of a movie based on the format of the transmission data.

At operation 240, the data reception apparatus 220 may transmit a data request message to the data transmission apparatus 210 in response to the data generation message.

In one example, at operation 230, only in response to the data transmission apparatus 210 broadcasting a data generation message to at least one data reception apparatus 220, and the data reception apparatus 220 desiring to receive transmission data generated by the data transmission apparatus 210, may the data reception apparatus 220 transmit a data request message to the data transmission apparatus 210. In another example, the data transmission apparatus 210 may broadcast a data generation message to a plurality of data reception apparatuses 220, and the data reception apparatuses 220 may desire to receive transmission data, and the plurality of data reception apparatuses 220 may each transmit a data request message to the data transmission apparatus 210.

At operation 250, the data transmission apparatus 210 may transmit data to the data reception apparatus 220 in response to the data request message.

The data transmission apparatus 210 may divide transmission data into a plurality of segments, and may transmit the divided segments to the data reception apparatus 220. In one example, the data reception apparatus 220 may transmit a data request message with respect to a first segment at operation 240, and may receive the first segment at operation 250. The data reception apparatus 220 may transmit again a data request message with respect to a second segment at operation 240, and may receive the second segment at operation 250.

According to an embodiment, a first data reception apparatus and a second data reception apparatus may receive transmission data. The data transmission apparatus 210 may broadcast a data generation message to the first data reception apparatus and the second data reception apparatus. The first data reception apparatus may transmit, to the data transmission apparatus 210, a data request message with respect to a first segment, and may receive the first segment from the data transmission apparatus 210. The second data reception apparatus may transmit, to the data transmission apparatus 210, a data request message with respect to a second segment, and may receive the second segment from the data transmission apparatus 210.

The first data reception apparatus may broadcast, to the data transmission apparatus 210 and the second data reception apparatus, the data request message with respect to the first segment. The first data reception apparatus may receive the first segment from the data transmission apparatus 210, and may also receive the first segment from the second data reception apparatus.

The second data reception apparatus may broadcast, to the data transmission apparatus 210 and the first data reception apparatus, the data request message with respect to the first segment. The second data reception may receive the first segment from the data transmission apparatus 210, and may also receive the first segment from the first data reception apparatus.

Figure 3:
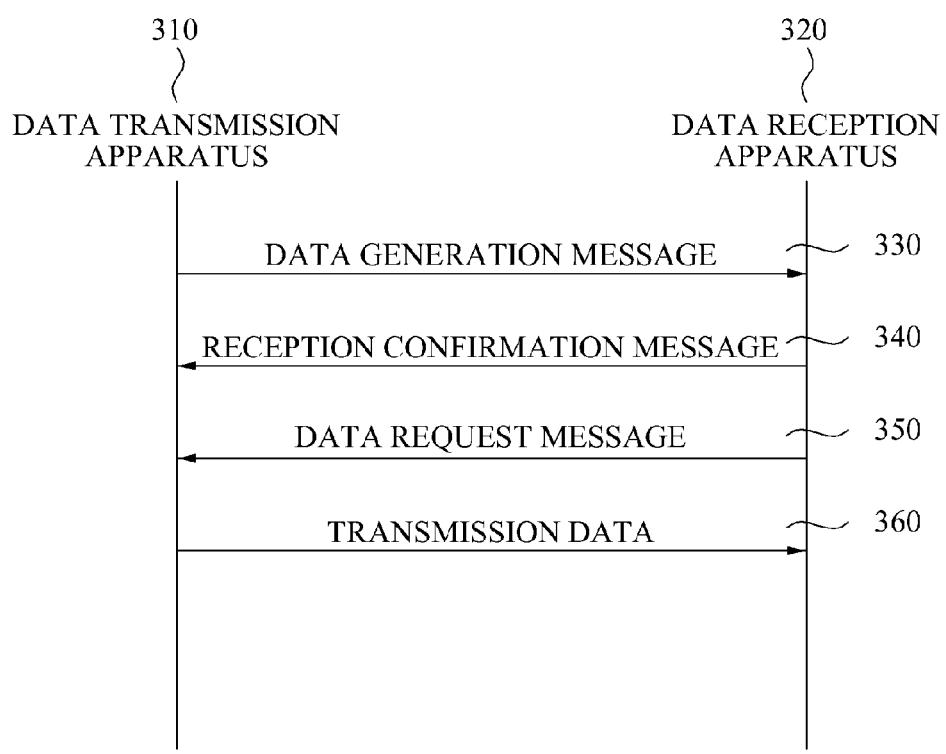
FIG. 3 is a diagram illustrating another example data transmission method.

FIG. 3 illustrates another example data transmission method.

At operation 330, a data transmission apparatus 310 may transmit a data generation message to a data reception apparatus 320. The data transmission apparatus 310 may transmit the data generation message to a plurality of unspecific data reception apparatuses connected to a communication network. The data transmission apparatus 310 and data reception apparatus 320 may be similar to the data transmission apparatuses and data reception apparatuses illustrated in FIGS. 1A and 1B.

In response to the data reception apparatus 320 successfully receiving the data generation message at operation 330, the data reception apparatus 320 may transmit, to the data transmission apparatus 310, a reception confirmation message with respect to the data generation message at operation 340. The data transmission apparatus 310 may determine a number of data reception apparatuses connected to the communication network, based on the reception confirmation message.

At operation 350 and operation 360, similar to operation 240 and operation 250 described above with respect to FIG. 2, the data transmission apparatus 310 may transmit transmission data to the data reception apparatus 320.

Figure 4:
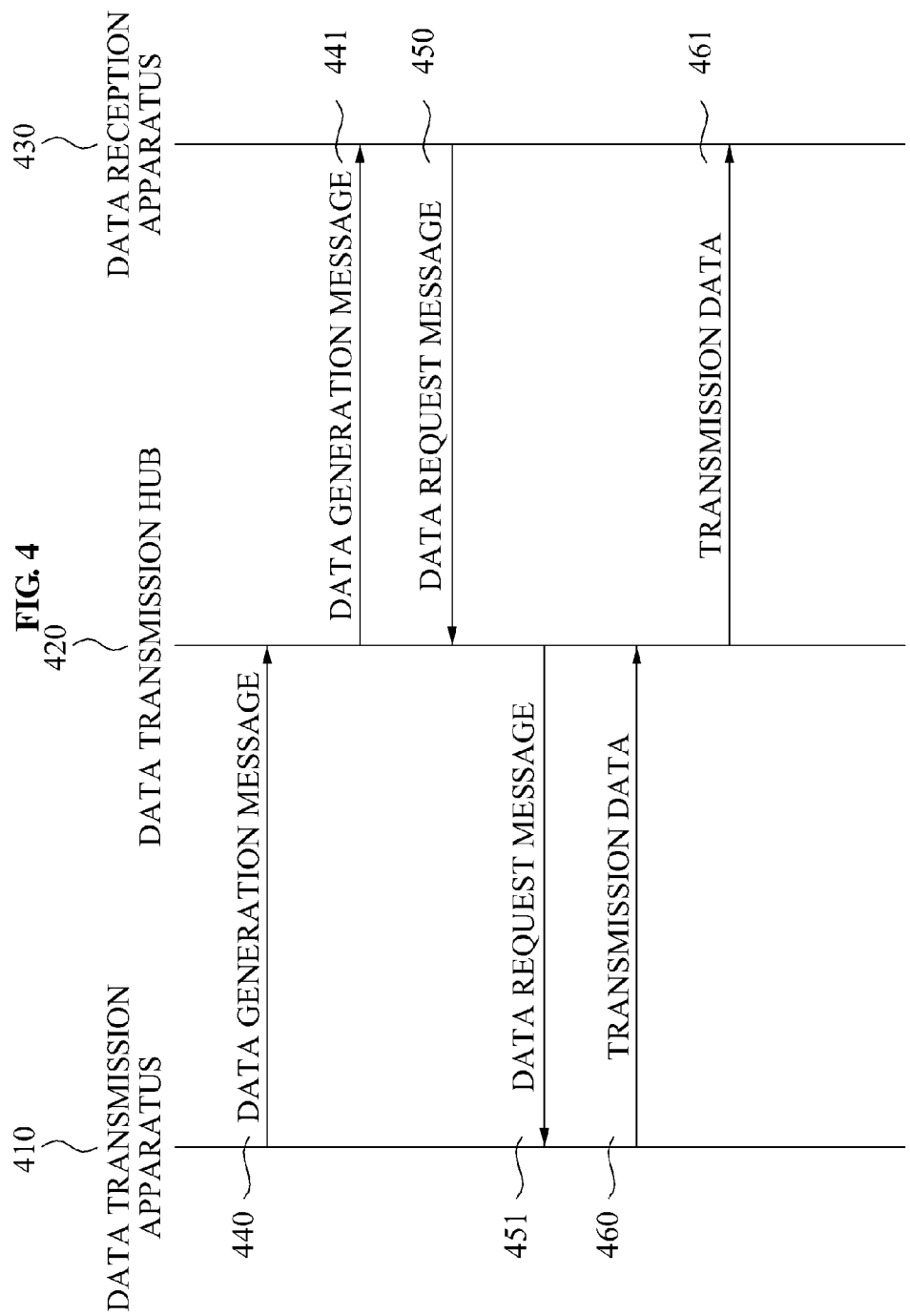
FIG. 4 is a diagram illustrating still another example data transmission method.

FIG. 4 illustrates still another example data transmission method.

At operation 440, a data transmission apparatus 410 may transmit a data generation message to a data transmission hub 420. A set-top box installed in a home, a computer, a mobile device, and the like, may be employed as the data transmission hub 420. The data transmission hub 420 may gather information associated with data reception apparatuses, e.g., a data reception apparatus 430, connected to the data transmission hub 420, and may generate an association table based on the gathered information.

The association table may include information regarding whether each of the data reception apparatuses is ready to receive data from the data transmission apparatus 310. For example, the association table may include information regarding whether each of the data reception apparatuses is powered on or powered off. The association table may include information associated with a state of a wireless channel of each data reception apparatus.

At operation 441, the data transmission hub 420 may transmit the data generation message to the data reception apparatus 430 by referring to the association table. For example, the data transmission hub 420 may transmit the data generation message to the data reception apparatus 430 being ready to receive transmission data from the data transmission apparatus 410 among the plurality of data reception apparatuses connected to the data transmission hub 420. The data transmission apparatus 410, data transmission hub 420, and data reception apparatus 430 may be similar to the data transmission apparatuses, data transmission hub, and data reception apparatuses illustrated in FIGS. 1A and 1B.

The data transmission hub 420 may update the association table based on a change in a state of the data reception apparatus 430. For example, when the state of the data reception apparatus 430 is changed from a power-off state to a power-on state, the data reception apparatus 430 may transmit an access signal to the data transmission hub 420. The data transmission hub 420 may change the state of the data reception apparatus 430 based on the access signal. The data reception apparatus 430 may periodically transmit the access signal to the data transmission hub 420. In response to the data transmission hub 420 not receiving the access signal during at least a predetermined period of time, the data transmission hub 420 may change the state of the data transmission apparatus 430 from the power-on state to the power-off state.

At operation 450, the data reception apparatus 430 may transmit a data request message to the data transmission hub 420. At operation 451, the data transmission hub 420 may forward the data request message to the data transmission apparatus 410.

At operation 460, the data transmission apparatus 410 may transmit transmission data to the data transmission hub 420 in response to the data request message. At operation 461, the data transmission hub 420 may forward the transmission data to the data reception apparatus 430.

Figure 5:
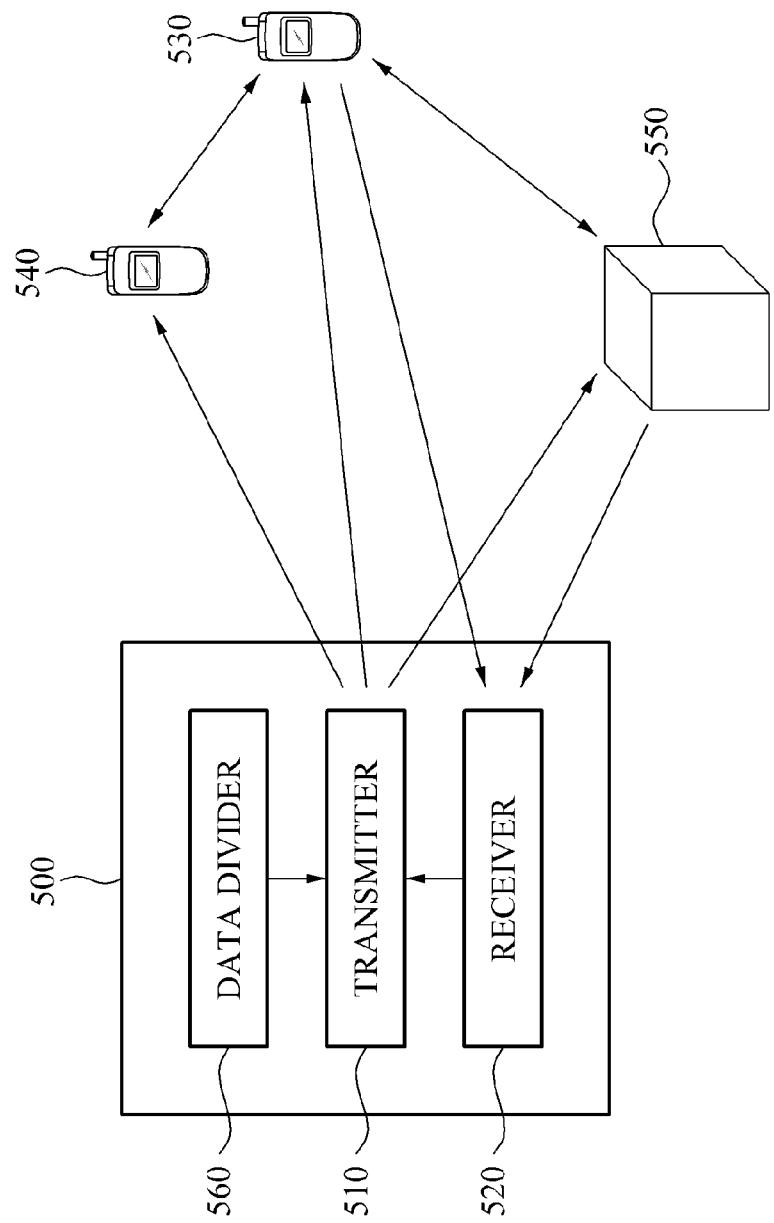
FIG. 5 is a block diagram an example structure of a data transmission apparatus.

FIG. 5 illustrates an example structure of a data transmission apparatus 500. The data transmission apparatus 500 may include a transmitter 510 and a receiver 520.

The transmitter 510 may transmit, to at least one data reception apparatus, for example, data reception apparatuses 530 and 540, a data generation message containing information associated with transmission data. Information associated with the transmission data may include, for example, at least one of a name of the transmission data, a creator of the transmission data, a generated time of the transmission data, a format of the transmission data, and a capacity of the transmission data.

The data generation message may be transmitted to the data reception apparatus 530 via a data transmission hub 550. The data transmission hub 550 may include state information associated with each of the data reception apparatuses 530 and 540, and may transmit the data generation message to the data reception apparatus 530 based on the state information. The data transmission apparatus 500, data transmission hub 550, and data reception apparatuses 530 and 540 may be similar to the data transmission apparatuses, data transmission hub, and data reception apparatuses illustrated in FIGS. 1A and 1B.

The receiver 520 may receive, from the data reception apparatuses 530 and 540, a reception confirmation message with respect to the data generation message. The receiver 520 may also receive a data request message from the data reception apparatuses 530 and 540 in response to the data generation message.

In response to the data request message, the transmitter 510 may transmit transmission data to the data reception apparatuses 530 and 540. A data divider 560 may divide the transmission data into a plurality of segments. In this example, the data request message may include a transmission request with respect to each of the segments. In response to the data request message, the transmitter 510 may transmit corresponding segments to the data reception apparatuses 530 and 540.

For example, the data reception apparatus 530 may broadcast a data request message so that the data transmission apparatus 500 and the data reception apparatus 540 may receive the data request message. The transmitter 510 may transmit transmission data to the data reception apparatus 530 via the data reception apparatus 540. Accordingly, data transmitted by the transmitter 510 may be shared between the data reception apparatuses 530 and 540.

An embodiment in which the data reception apparatuses 530 and 540 share received data will be further described.

Data broadcast by the data reception apparatus 530 may be transmitted to the data transmission apparatus 500 and the data reception apparatus 540. In this example, the receiver 520 may receive a data request message from the data reception apparatuses 530 and 540.

In response to the transmitter 510 transmitting transmission data to the data reception apparatus 540, the data reception apparatus 540 may forward the transmission data to the data reception apparatus 530 in response to the data request message.

In response to the data transmission apparatus 500 transmitting data to a large number of data reception apparatuses, the data reception apparatuses may share the received data to decrease a transmission load of the data transmission apparatus 500.

The data transmission apparatus 500 may send data directly to the data transmission hub 550, or either of the data reception apparatuses 530 and 540. The data transmission apparatus 500 may also send data to either of the data reception apparatuses 530 and 540 via the data transmission hub 550. The data transmission apparatus 500 may also send data to either one of the data reception apparatuses 530 and 540 via the other data reception apparatus 540 and 530, respectively. The data reception apparatuses 530 and 540 may be primary and secondary, interchangeably.

Figure 6:
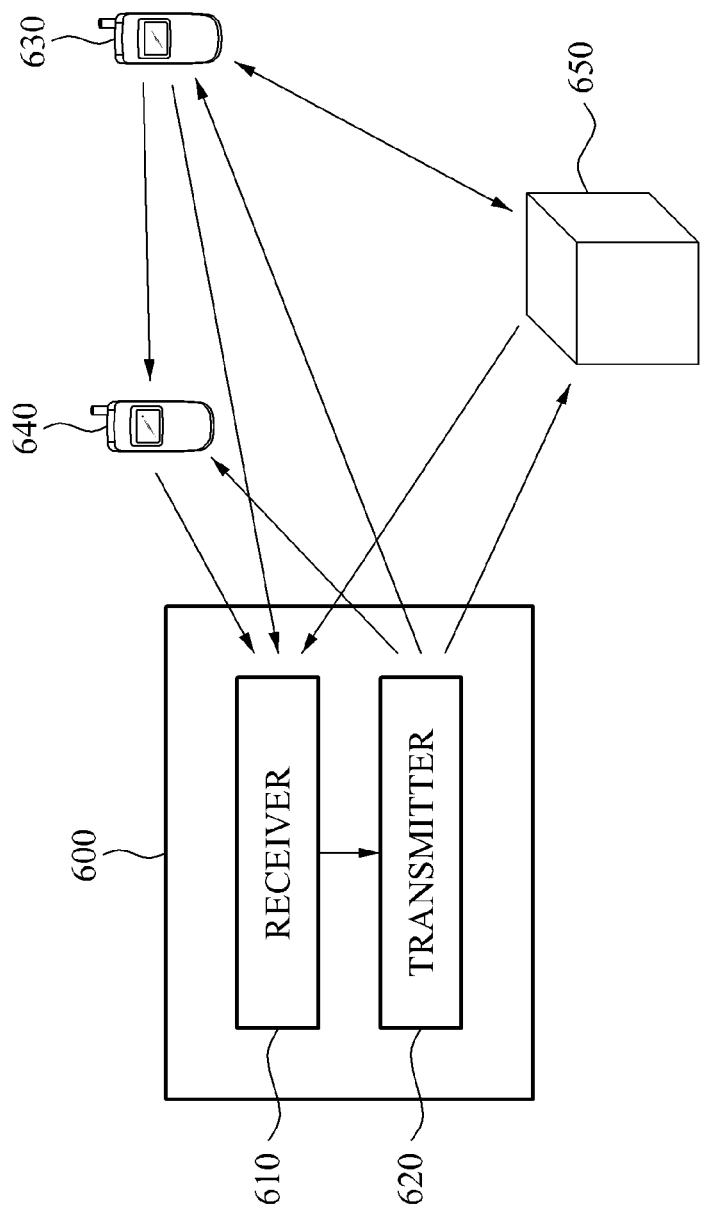
FIG. 6 is a block diagram illustrating an example structure of a data reception apparatus.

FIG. 6 illustrates an example structure of a data reception apparatus 600. The data reception apparatus 600 may include a receiver 610 and a transmitter 620.

The receiver 610 may receive, from a data transmission apparatus 630, a data generation message containing information associated with transmission data. Information associated with the transmission data may include, for example, at least one of a name of the transmission data, a creator of the transmission data, a generated time of the transmission data, a format of the transmission data, and a capacity of the transmission data.

The transmitter 620 may transmit, to the data transmission apparatus 630, a reception confirmation message with respect to the data generation message.

The transmitter 620 may determine whether to receive data based on information associated with the transmission data. In response to determining that data should be received, the transmitter 620 may transmit a data request message to the data transmission apparatus 630.

In response to the data request message, the receiver 610 may receive transmission data from the data transmission apparatus 630 or 640.

The data reception apparatus 600 may receive the transmission data via a data transmission hub 650. The data transmission hub 650 may include an association table including state information associated with the data reception apparatus 600. The association table may include state information regarding whether the data reception apparatus 600 is ready to receive data from the data transmission apparatus 630.

The data transmission hub 650 may receive a data generation message from the data transmission apparatus 630, and may forward the data generation message to the data reception apparatus 600 by referring to the association table.

The data transmission hub 650 may also receive the data request message from the data reception apparatus 600, and may forward the data request message to the data transmission apparatus 630 by referring to the association table.

The data reception apparatuses 600 and 640 may share transmission data received from the data transmission apparatus 630. In this example, transmission data may be transmitted to the data reception apparatus 600 via the data reception apparatus 640.

For example, the data reception apparatus 640 may receive the transmission data from the data transmission apparatus 630. The transmitter 620 may transmit the data request message to both the data transmission apparatus 630 and the data reception apparatus 640. The data reception apparatus 640 may transmit the transmission data to the data reception data 600. In response to the data request message, the receiver 610 may receive the transmission data from the data reception apparatus 640.

The data reception apparatus 600 may receive data directly from the data transmission device 630. The data reception apparatus 600 may also receive data directly from another data reception apparatus, e.g., the data reception apparatus 640, or via the data transmission hub 650. The data reception apparatuses 600 and 640 may be primary and secondary, interchangeably.

Figure 7:
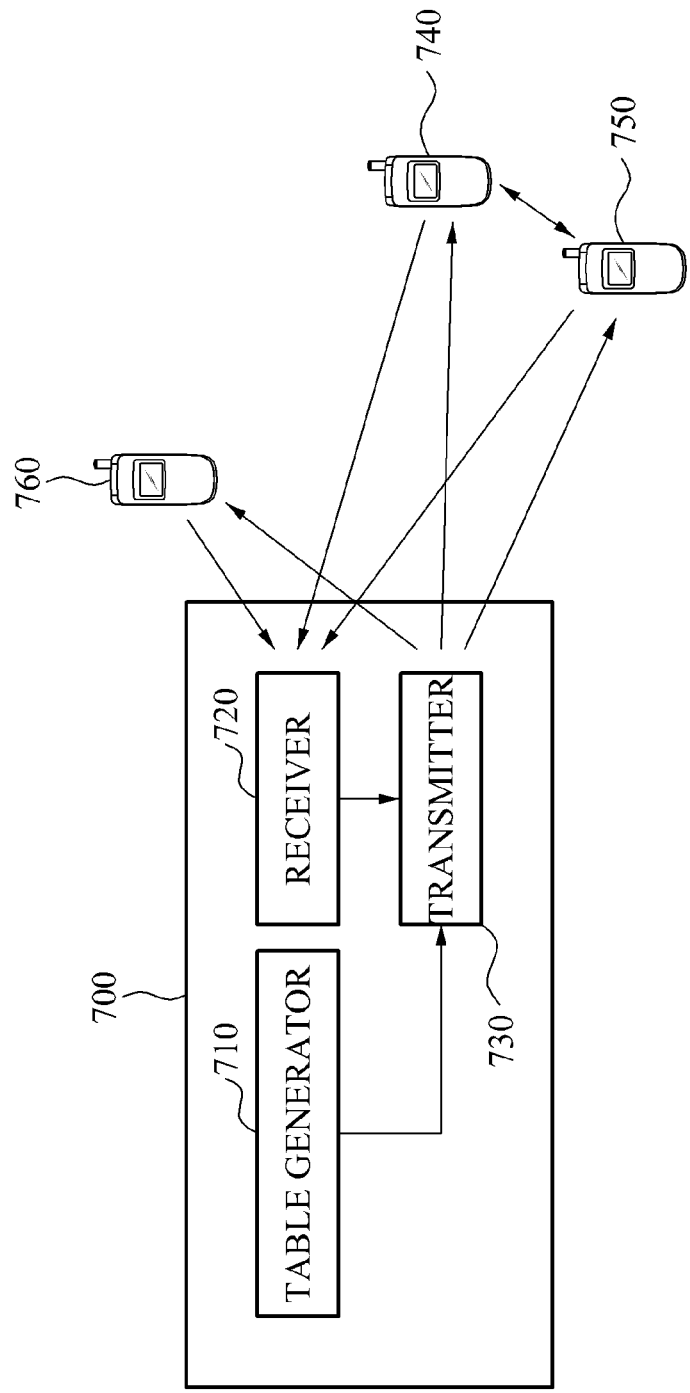
FIG. 7 is a block diagram illustrating an example structure of a data transmission hub.

FIG. 7 illustrates an example structure of a data transmission hub 700. The data transmission hub 700 may include a table generator 710, a receiver 720, and a transmitter 730.

The table generator 710 may generate an association table containing state information associated with at least one data reception apparatus, for example, data reception apparatuses 740 and 750, connected to the data transmission hub 700. The state information may include information regarding whether each of the data reception apparatuses 740 and 740 is ready to receive transmission data from a data transmission apparatus 760. As described above, it should be appreciated that embodiments are not limited to a table, and other data storage formats may be used. It should also be appreciated that embodiments include examples in which the association information is not generated by the data transmission hub 700, but is provided to the data transmission hub 700 by another source, e.g., an association server (not shown), and the like.

The receiver 720 may generate a data generation message from the data transmission apparatus 760. The transmitter 730 may forward the data generation message to the data reception apparatuses 740 and 750 based on the association table. The transmitter 730 may determine that the data reception apparatuses 740 and 750 are ready to receive data from the data transmission apparatus 760, based on the association table. The transmitter 730 may forward the data generation message to the ready data reception apparatuses 740 and 750. Embodiments also include examples in which the data generation message is broadcast to all associated devices, regardless of readiness.

In response to the data generation message, the receiver 720 may receive a data request message from the data reception apparatuses 740 and 750. The transmitter 730 may forward the data request message to the data transmission apparatus 760.

In response to the data request message, the receiver 720 may receive the transmission data from the data transmission apparatus 760, and may forward the transmission data to the data reception apparatuses 740 and 750. The data reception apparatuses 740 and 750 may be primary and secondary, interchangeably.

Although a home is described for the data transmission hubs 160 and 420, any stationary or static location, e.g., where devices may be registered with, identified to, or recognized by the data transmission hubs 160 and 420, may be used. Non-exhaustive and nonlimiting examples include, a store, an office, a school or daycare, a fire or police station, a gas station, a highway rest stop or truck stop or weigh station, a house or apartment building, a trailer park, a park or campsite, a subway or metro station, a train or train station, an airport or airplane, a shopping center, a parking garage, a boat, a ferry, a ship, a bridge or tunnel, etc.

As a non-exhaustive illustration only, the data transmission and reception devices, and the data transmission hub described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data transmission apparatus comprising:
    a transmitter configured to transmit, to a data reception apparatus, a data generation message indicating generation of transmission data, wherein the data generation message comprises information associated with the transmission data; and
    a receiver configured to receive, from the data reception apparatus, a periodic data request message responding to the data generation message,
    wherein the transmitter is further configured to transmit, to the data reception apparatus, the transmission data in response to receiving the data request message;
    wherein the transmitter is further configured to generate the data generation message via a data transmission hub configured to maintain state information associated with the data reception apparatus; and
    wherein the receiver is further configured to receive the data request message via the data transmission hub.

2. The data transmission apparatus of claim 1, wherein the information associated with the transmission data comprises at least one of: a name of the transmission data, a creator of the transmission data, a generated time of the transmission data, a format of the transmission data, and a capacity of the transmission data.

3. The data transmission apparatus of claim 1, further comprising:
    a data divider configured to divide the transmission data into a plurality of segments, wherein
    the transmitter is further configured to transmit each of the segments to the data reception apparatus.

4. The data transmission apparatus of claim 1, wherein the receiver is further configured to receive, from the data reception apparatus, a reception confirmation message confirming receipt of the data generation message.

5. The data transmission apparatus of claim 1, wherein:
    the data reception apparatus comprises a primary data reception apparatus and a secondary data reception apparatus;
    the receiver is further configured to receive the data request message from the primary data reception apparatus and the secondary data reception apparatus;
    the secondary data reception apparatus is configured to receive the data request message from the primary data reception apparatus;
    the transmitter is further configured to transmit the transmission data to the secondary data reception apparatus; and
    the secondary data reception apparatus is further configured to transmit the transmission data to the primary data reception apparatus.

6. A data reception apparatus comprising:
    a receiver configured to receive, from a data transmission apparatus, a data generation message indicating generation of transmission data, wherein the data generation message comprises information associated with the transmission data; and
    a transmitter configured to transmit, to the data transmission apparatus, a periodic data request message responding to the data generation message,
    wherein the receiver is further configured to receive, after transmitting the data request message, the transmission data from the data transmission apparatus;
    wherein the receiver is further configured to receive the data generation message via a data transmission hub configured to maintain state information associated with the data reception apparatus; and wherein the transmitter is further configured to transmit the data request message via the data transmission hub.

7. The data reception apparatus of claim 6, wherein the information associated with the transmission data comprises at least one of: a name of the transmission data, a creator of the transmission data, a generated time of the transmission data, a format of the transmission data, and a capacity of the transmission data.

8. The data reception apparatus of claim 6, wherein the transmitter is further configured to transmit, to the data transmission apparatus, a reception confirmation message that confirms receipt of the data generation message.

9. The data reception apparatus of claim 6, wherein:
the transmitter is further configured to transmit the data request message to a second data reception apparatus configured to receive the transmission data from the data transmission apparatus; and
the receiver is further configured to receive, after transmitting the data request message, the transmission data from the second data reception apparatus.

10. A data transmission hub comprising:
a table generator configured to generate an association table containing state information associated with a data reception apparatus connected to the data transmission hub;
a receiver configured to receive, from a data transmission apparatus, a data generation message indicating generation of transmission data, wherein the data generation message comprises information associated with the transmission data; and
a transmitter configured to forward the data generation message to the data reception apparatus based on the association table, wherein
the receiver is further configured to receive, from the data reception apparatus, a periodically transmitted data request message responding to the data generation message.

11. The data transmission hub of claim 10, wherein the transmitter is further configured to forward the data request message to the data transmission apparatus.

12. The data transmission hub of claim 11, wherein:
the receiver is further configured to receive, in response to receiving the data request message, the transmission data from the data transmission apparatus, and
the transmitter is further configured to forward the transmission data to the data reception apparatus.

13. The data transmission hub of claim 10, wherein the state information indicates whether the data reception apparatus is ready to receive the transmission data.

14. A data transmission hub comprising:
a table generator configured to generate an association table containing state information associated with a data reception apparatus connected to a data transmission hub;
a receiver configured to receive, from a data transmission apparatus, a data generation message indicating generation of transmission data, wherein the data generation message comprises information associated with the transmission data; and
a transmitter configured to forward the data generation message to the data reception apparatus based on state information associated with the data reception apparatus, wherein the receiver is further configured to receive, from the data reception apparatus, a data request message responding to the data generation message.

15. A data transmission method comprising: maintaining an association table containing state information associated with a data reception apparatus connected to a data transmission hub;
transmitting, at the data transmission hub and to the data reception apparatus, a data generation message indicating generation of transmission data, wherein the data generation message comprises information associated with the transmission data;
receiving, at the data transmission hub and from the data reception apparatus, a periodic data request message responding to the data generation message; and
transmitting, to the data reception apparatus, the transmission data in response to receiving the data request message.

16. A data reception method comprising:
maintaining an association table containing state information associated with a data reception apparatus connected to a data transmission hub;
receiving, at the data transmission hub and from a data transmission apparatus, a data generation message indicating generation of transmission data,
wherein the data generation message contains information associated with the transmission data;
transmitting, from the data transmission hub and to the data transmission apparatus, a periodic data request message responding to the data generation message; and
receiving, from the data transmission apparatus, the transmission data responding to the data request message.

17. A data transmission method comprising:
generating an association table containing state information associated with a data reception apparatus connected to a data transmission hub;
receiving, at the data transmission hub and from a data transmission apparatus, a data generation message indicating generation of transmission data,
wherein the data generation message comprises information associated with the transmission data;
forwarding the data generation message to the data reception apparatus, based on the association table; and
receiving, at the data transmission hub and from the data reception apparatus, a periodically transmitted data request message responding to the data generation message.

18. A data transmission method comprising:
generating an association table containing state information associated with a data reception apparatus connected to a data transmission hub;
receiving, at the data transmission hub and from a data transmission apparatus, a data generation message indicating generation of transmission data,
wherein the data generation message comprises information associated with the transmission data;
forwarding the data generation message to the data reception apparatus based on state information associated with the data reception apparatus; and
receiving, at the data transmission hub and from the data reception apparatus, a periodically transmitted data request message responding to the data generation message.

* * * * *